United States Patent
Raikin et al.

(10) Patent No.: US 8,209,689 B2
(45) Date of Patent: Jun. 26, 2012

(54) LIVE LOCK FREE PRIORITY SCHEME FOR MEMORY TRANSACTIONS IN TRANSACTIONAL MEMORY

(75) Inventors: Shlomo Raikin, Geva Carmel (IL); Shay Gueron, Haifa (IL); Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1322 days.

(21) Appl. No.: 11/854,175

(22) Filed: Sep. 12, 2007

(65) Prior Publication Data

US 2009/0070774 A1    Mar. 12, 2009

(51) Int. Cl.
G06F 9/52     (2006.01)
G06F 13/14    (2006.01)
G06F 12/00    (2006.01)
G06F 7/00     (2006.01)
G06F 13/00    (2006.01)

(52) U.S. Cl. ........ 718/100; 718/101; 718/102; 718/103; 710/100; 710/200; 710/220; 710/240; 710/241; 710/242; 710/243; 710/244; 707/703; 711/147; 711/148; 711/149; 711/150; 711/151; 711/152

(58) Field of Classification Search .................... None
See application file for complete search history.

(56) References Cited

U.S. PATENT DOCUMENTS

| | | | | |
|---|---|---|---|---|
| 5,241,664 A | * | 8/1993 | Ohba et al. ................... | 711/121 |
| 5,402,423 A | * | 3/1995 | Van Kersen et al. .......... | 370/419 |
| 5,996,037 A | * | 11/1999 | Emnett .......................... | 710/117 |
| 6,295,284 B1 | * | 9/2001 | Maggenti ...................... | 370/328 |
| 6,330,647 B1 | * | 12/2001 | Jeddeloh et al. .............. | 711/158 |
| 6,523,076 B1 | * | 2/2003 | Kruse ........................... | 710/119 |
| 7,068,672 B1 | * | 6/2006 | Jones ............................. | 370/412 |
| 2005/0033906 A1 | * | 2/2005 | Mastronarde et al. ........ | 711/100 |
| 2006/0080506 A1 | * | 4/2006 | Rajamony et al. ............ | 711/119 |
| 2007/0073948 A1 | * | 3/2007 | Hamao .......................... | 710/110 |
| 2007/0239915 A1 | * | 10/2007 | Saha et al. .................... | 710/200 |
| 2008/0091883 A1 | * | 4/2008 | Cox et al. ...................... | 711/130 |
| 2008/0195825 A1 | * | 8/2008 | Syed et al. .................... | 711/161 |

* cited by examiner

Primary Examiner — Qing Wu (74) Attorney, Agent, or Firm — Blakely, Sokoloff, Taylor & Zafman LLP (57) ABSTRACT

A method and apparatus for avoiding live-lock during transaction execution is herein described. Counting logic is utilized to track successfully committed transactions for each processing element. When a data conflict is detected between transactions on multiple processing elements, priority is provided to the processing element with the lower counting logic value. Furthermore, if the values are the same, then the processing element with the lower identification value is given priority, i.e. allowed to continue while the other transaction is aborted. To avoid live-lock between processing elements that both have predetermined counting logic values, such as maximum counting values, when one processing element reaches the predetermined counting value all counters are reset. In addition, a failure at maximum value (FMV) counter may be provided to count a number of aborts of a transaction when counting logic is at a maximum value. When the FMV counter is at a predetermined number of aborts the counting logic is reset to avoid live lock.

18 Claims, 4 Drawing Sheets

LIVE LOCK FREE PRIORITY SCHEME FOR MEMORY TRANSACTIONS IN TRANSACTIONAL MEMORY

FIELD

This invention relates to the field of concurrent computing and, in particular, to execution of transactions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing elements, such as cores, threads, and/or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. However, a live-lock event may occur in attempt to decide which of the transactions is aborted. As a result, one thread is potentially able to continue processing of transactions, while another thread is locked attempting to re-execute the aborted transactions. This potentially results in inefficient execution, as one thread is continuously spinning on a single transaction.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for providing live-lock free transactional execution. Specifically, providing live-lock free transactional execution is primarily discussed in reference to a multi-core microprocessor. However, the methods and apparatus for providing live-lock free transactional execution are not so limited, as they may be implemented on or in association with any integrated circuit device or system, such as cell phones, personal digital assistants, embedded controllers, mobile platforms, desktop platforms, and server platforms, as well as in conjunction with single processor systems or multi-processor systems; each processor having any number of processing elements, such as a core, hardware thread, software thread, logical processor, or other processing element.

Figure 1:
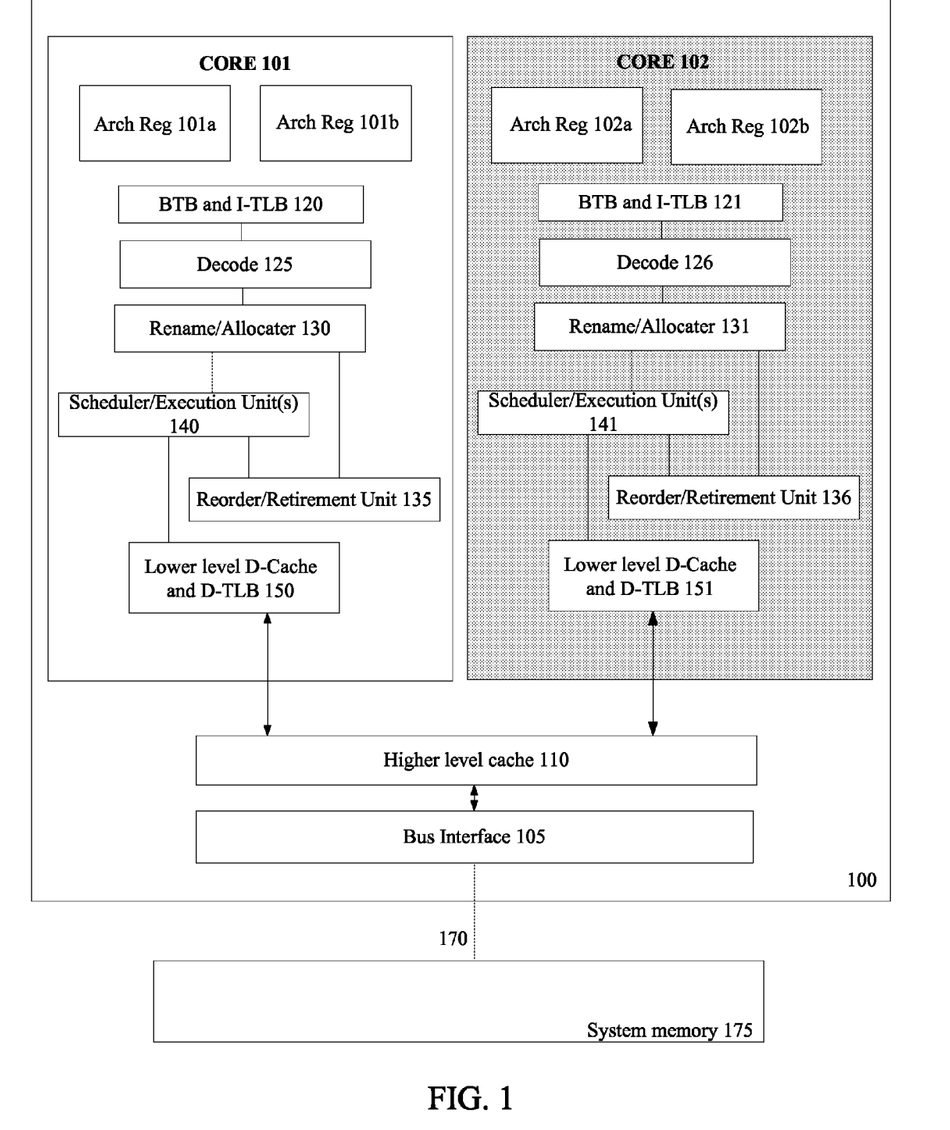
FIG. 1 illustrates an embodiment a multi-core processor capable of preventing live-lock during concurrent execution of transactions.

Referring to FIG. 1, an embodiment of a multi-core processor capable of providing live-lock free transactional execution is illustrated. A processing element refers to a thread, a process, a context, a logical processor, a hardware thread, a core, and/or any processing element, which shares access to resources of the processor, such as reservation units, execution units, pipelines, or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 101*a* and 101*b*, while core 102 includes two hardware threads 102*a* and 102*b*. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101*a*, a second thread is associated with architecture state registers 101*b*, a third thread is associated with architecture state registers 102*a*, and a fourth thread is associated with architecture state registers 102*b*. Reference to processing elements in processor 100, in one embodiment, includes reference to cores 101 and 102, as well as threads 101*a*, 101*b*, 102*a*, and 102*b*. In another embodiment, a processing element refers to elements at the same level in a hierarchy of processing domain. For example, core 101 and 102 are in the same domain level, and threads 101*a*, 101*b*, 102*a*, and 102*b* are in the same domain level, as they are all included within a core's domain.

Although processor 100 may include asymmetric cores, i.e. cores with different configurations, functional units, and/or logic, symmetric cores are illustrated in FIG. 1. As a result, core 102, which is illustrated as identical to core 101, will not be discussed in detail to avoid obscuring the discussion.

As illustrated, architecture state registers 101*a* are replicated in architecture state registers 101*b*, so individual architecture states/contexts are capable of being stored for logical processor 101*a* and logical processor 101*b*. Other smaller resources, such as instruction pointers and renaming logic in rename allocater logic 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 110, execution unit(s) 140, and out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent (DDR) bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. Previously, a D-TLB entry includes a virtual address, a physical address, and other information, such as an offset, to provide inexpensive translations for recently used virtual memory addresses.

In FIG. 1, processor 100 is illustrated as one physical microprocessor with two cores and four hardware threads, which is capable of concurrently executing multiple transactions. A transaction often refers to a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware of processor 100. For example, an annotation/attribute field, which is associated with a cache line in lower level cache 150, is utilized to track accesses to and from the cache line during execution of a transaction. Examples of utilizing an attribute field for transactional execution are included in co-pending application with Ser. No. 11/027,623, issued as U.S. Pat. No. 7,984,248 on Jul. 19, 2011, entitled, "Transaction based shared data operations in a Multiprocessor Environment".

A Software Transactional Memory (STM) system often refers to performing access tracking, conflict resolution, or other transactional memory tasks in software. As a general example, a compiler in system memory, when executed by processor 100, compiles program code to insert read and write barriers into load and store operations, accordingly, which are part of transactions within the program code. The compiler may also insert other transaction related operations, such as commit or abort operations. These inserted instructions/calls provide for logging of load and/or store operations in memory during execution. Furthermore, inserted calls for validation and commit utilize the previously logged values to detect conflicts and validate transaction operations.

Yet, any style of transactional memory may be implemented in processor 100, including an HTM, an STM, a hardware accelerated STM (HASTM), unbounded transactional memory (UTM), a virtualized transactional memory (VTM), or other combination/hybrid of transactional memory techniques. Despite the transactional memory system, processor 100, in one embodiment, is capable of providing live-lock free transactional execution, as discussed below.

Even though discussion of physical processor 100 has focused on microprocessors, processor 100 may include any physical processing device, such as an embedded processor, cell-processor, microprocessor, or other known processor, which includes any number of multiple cores/threads. Moreover, an oversimplified illustrative microarchitecture of an out-of-order of processor is illustrated for processor 100. However, any of the modules/units illustrated in processor 100 may be configured in a different order/manner, may be excluded, as well as may overlap one another including portions of components that reside in multiple modules. For example, a reservation unit may be distributed in processor 100 including multiple smaller reservation tables in different modules of processor 100.

Figure 2:
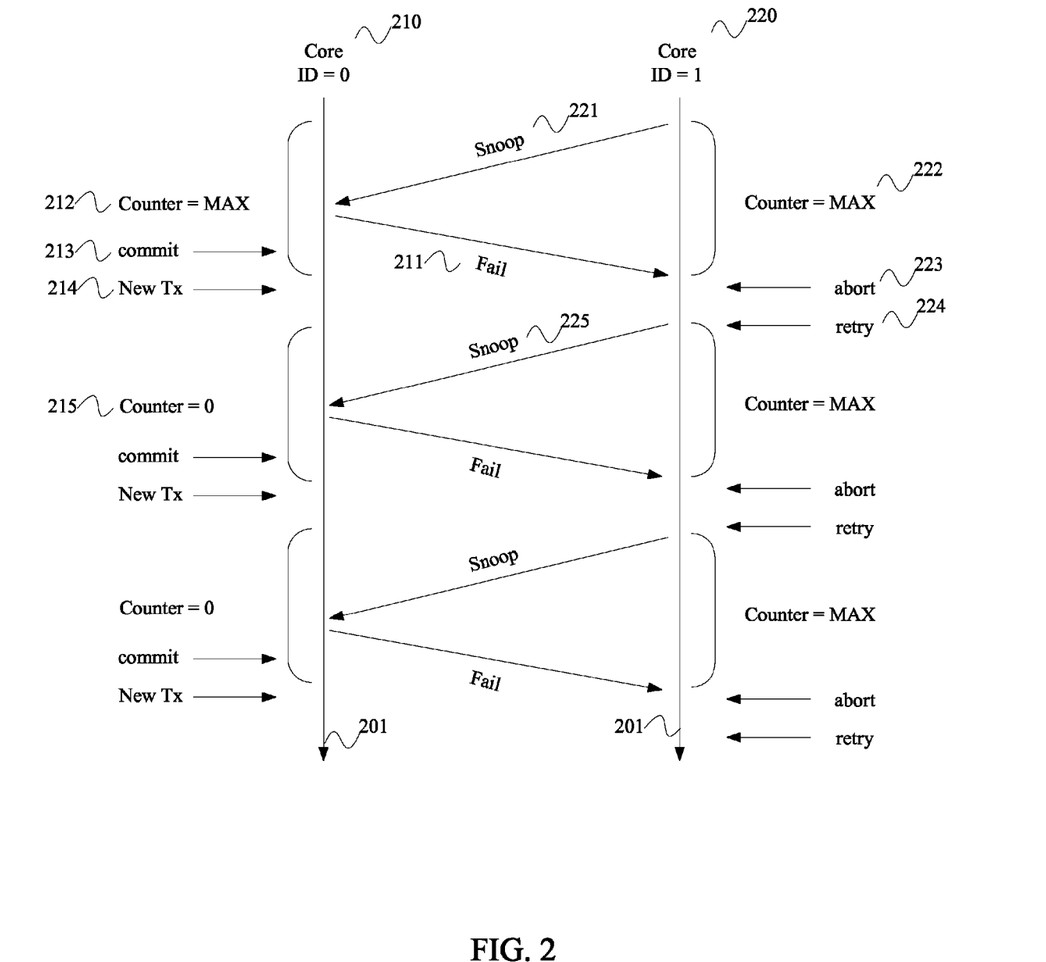
FIG. 2 illustrates an embodiment of a diagram for a potential live-lock event.

Turning to FIG. 2, an embodiment of a resolving data contention between transactions based on priority is illustrated. As stated above, data contention/collision may be detected through use of hardware, software, or a combination thereof. The diagram in FIG. 2 illustrates resolution of transactional data collision between two cores as time progresses according to timeline 201. In one embodiment, each core or processing element is associated with a priority. In other words, a transaction being executed on a processing element is associated with a priority, which may be stored by the processing element for the transaction.

As an example, core 210 and core 220 each include a counter, whose value is incremented upon successful completion of a transaction or upon committing a transaction. Incrementing a counter may include updating the counter by a single integer interval, or other amount. For example, a counter is incremented to a higher value then the highest counter value referenced in a snoop request during execution of the transaction. In other words, a local counter is set to at least the highest counter value observed during conflict resolution. To illustrate, if a local counter for core 0 is set to a value of 10 and a snoop request from core 1 references a counter value of 771, then upon committing the transaction on core 0, core 0's counter value, in one embodiment, is incremented to 772. In response to reaching a maximum value of the counter, the counter is reset when the current transaction is committed. When a data collision is detected, such as multiple transactions reading, writing, updating, or otherwise accessing the same data location, in one embodiment, the transaction with the higher priority is allowed to continue while the other transactions are aborted and retried.

To illustrate a potential live lock event, FIG. 2 illustrates a first counter associated with core 210 is at a maximum value at time 212 and a second counter associated with core 220 is also at a maximum value at time 222. Core 220, which is executing a transaction, sends snoop request 221. In one embodiment, snoop request 221 includes reference to a data location and/or address, as well as a reference to the counter value 222 associated with the transaction causing snoop request 221. Note that snoop request 221 may be sent to a shared memory, such as a cache, which is shared by cores 210 and 220, or to a private cache of core 210, which is used to track accesses during execution of a transaction.

Here, a data collision is detected, when snoop request 221 indicates an access to a location previously accessed by core 210 during execution of a pending transaction. In one embodiment, the transaction with the higher priority is allowed to continue execution, while the lower priority transaction is aborted. Here, priority is based on the values of counters. For example, the counter with the lower value is considered the higher priority counter. In one embodiment, snoop request 221 includes a reference to counter value 222 on core 220. Therefore, core 210 compares its counter value with the counter value referenced by snoop request 221 to determine which one receives priority to continue execution. However, as illustrated, both counter values are at a maximum value.

In one embodiment, when counter values are equal, the core with the lower core identification (ID) value is allowed to continue execution, while the higher core ID value is aborted. Here, core 210 has a lower ID of zero, so it is determined that the transaction executing on core 210 is allowed to continue. As a result, a fail message 211 is sent back to core 220, which causes the transaction on core 220 to abort 223. The transaction executing on core 210 is able to commit 213, and start execution of new transaction 214. In addition, the transaction that just failed on core 220 may retry 224, which initiates subsequent snoop 225.

Yet, in response to the transaction on core 210 successfully completing or that the counter is at a max value, the counter is reset 215. Therefore, if snoop 225 results in another data collision, the new transaction executing on core 210 is allowed to continue, as its counter value of zero is less than the maximum value of core 220's counter. As can be seen, this process potentially repeats, which results in a live-lock event. Here, the live-lock entails core 210 being allowed to continue execution of transactions, while core 220 spins on retrying a single transaction. Theoretically, core 220 may never make any progress if data collisions with lower counter value and/or lower core ID transactions.

Figure 3:
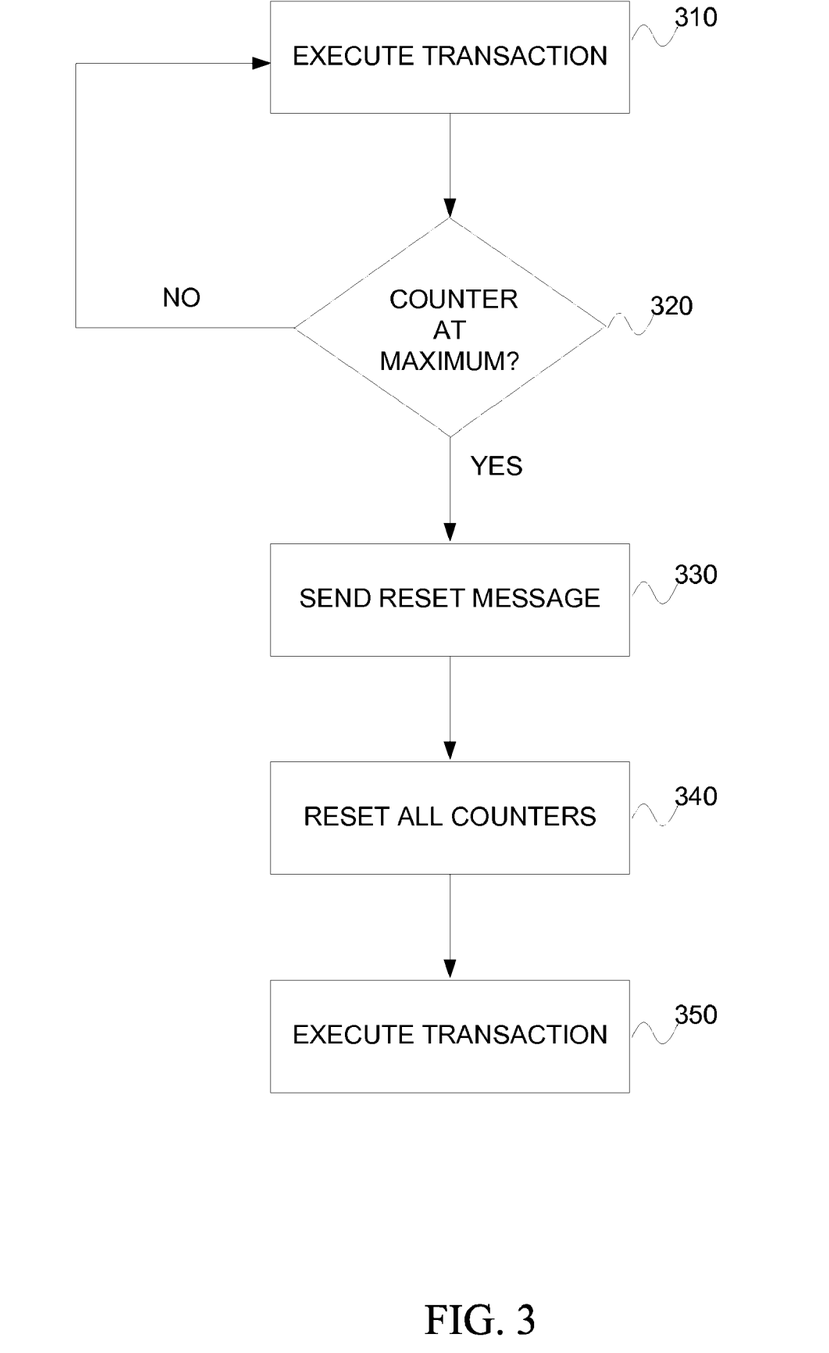
FIG. 3 illustrates an embodiment of a flow diagram for a method of providing for live-lock free transactional execution.

Turning to FIG. 3, an embodiment of a flow diagram for a method of avoiding live lock events is illustrated. In flow 310, a processing element, such as a core, executes a transaction. In response to committing the transaction, it is determined if a counter is at a maximum value in flow 320. If the counter is not at a maximum value, then the processing element will continue normal execution, such as execution of other transactions in return to flow 310. In contrast, if the counter value is at a maximum value, then in flow 330 a reset message will be sent to other processing elements.

Furthermore, in flow 340 all counters associated with counting committed transactions will be reset, in response to the reset message, including a counter associated with the processing element initiating the reset message. Next, in flow 350 other transactions are executed normally after the reset.

Returning to the discussion of FIG. 2 in relation to the flow diagram of FIG. 3, when transaction commit 213 occurs, in this embodiment, instead of resetting only core 210's counter, a reset message is sent to core 220 to reset its counter. As a result, on the next data collision, core 210 may be given priority due to both cores being reset to zero; however, the subsequent data collision will result in core 220 receiving priority, as it has the lowest counter value of zero. Therefore, core 220 spinning on the same transaction for more than two consecutive collisions within a transaction due to a maximum counter value may be avoided.

In one embodiment, priority may be provided to a core or multiple cores in response to a reset. For example, in FIG. 2, if core 210 and 220 are reset to zero, then during the next data collision core 210 still retains priority due to core ID, as discussed above. However, in one embodiment, all processing elements receiving the reset signal are reset to a higher value than the processing element generating the reset signal.

As an example, after commit 213, core 210 sends a reset signal. Core 220, having received the reset signal, resets to a value of one, while core 210, having generated the reset signal, resets to a value of zero. Upon a next data collision, it is ensured that core 210 retains priority, as it is set to a lower value. In the alternative, all processing elements receiving the reset signal are reset to a lower value than the processing element generating the reset signal. Here, other processing elements, such as core 220, which were aborted due to a priority conflict are given higher priority on a reset to ensure execution of its pending transaction.

Figure 4:
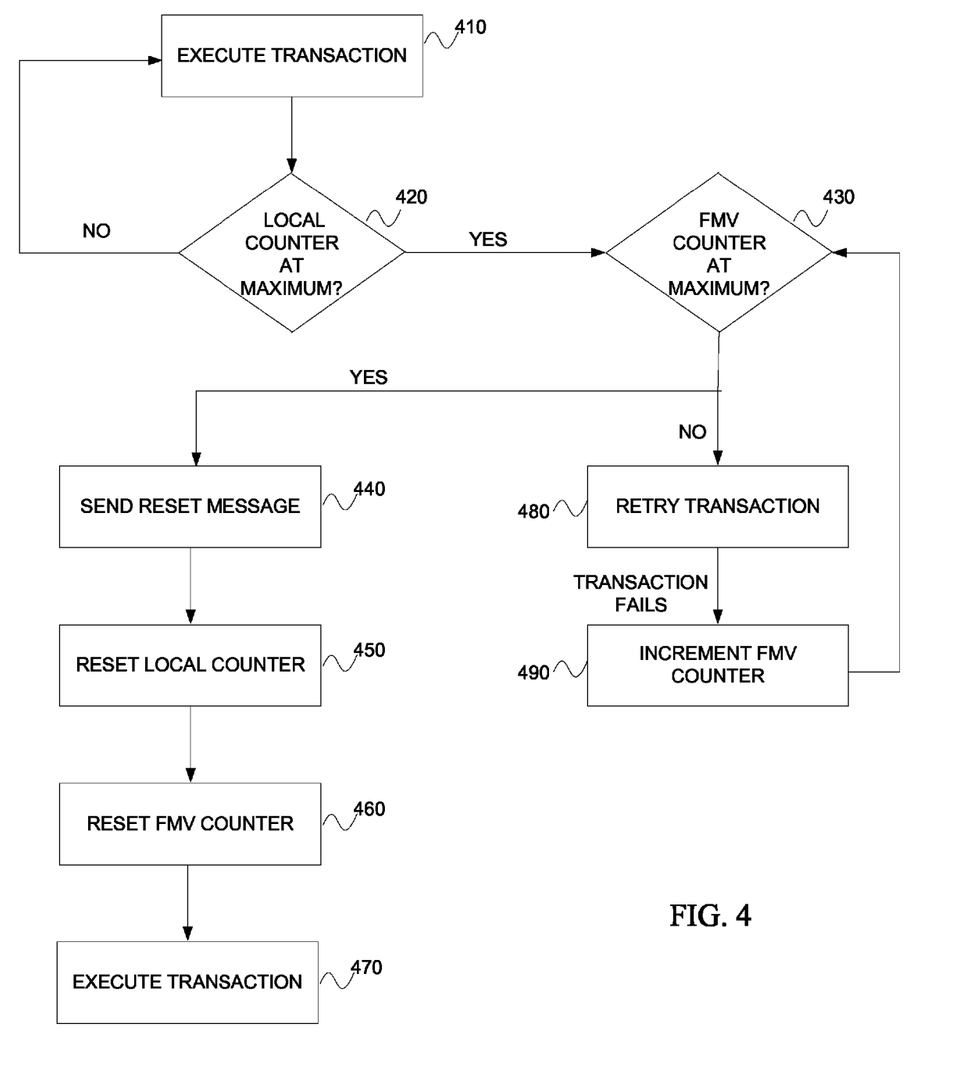
FIG. 4 illustrates another embodiment of a flow diagram for a method of providing for live-lock free transactional execution.

Referring next to FIG. 4, another embodiment of a flow diagram for a method of avoiding live-lock event is illustrated. Similarly to FIG. 3, in flow 410 and 420 transactions are executed and a local max value is checked. Here, if the counter is at a maximum value, then in flow 430 a failure at maximum value (FMV) counter is checked. If the FMV counter is at a maximum value, then as in FIG. 3, a reset message is sent in flow 440, local/FMV counters are reset in flows 450/460, and other transactions are executed in flow 470. In contrast, if the FMV counter is not at a max value, then the transaction is retried in flow 480 and incremented in flow 490.

Essentially, the double counters allow for a transaction to fail and retry a predetermined number of times, when the local counter is at a maximum value. Therefore, instead of resetting all counters every time any local counter reaches a maximum and resets, a transaction is allowed to fail a predetermined number of times, when its associated local counter is at a maximum value, before resetting. To illustrate, in FIG. 2, the counter for core 220 is at a maximum value at 222. Therefore, upon failure 223 an FMV counter is incremented. Therefore, counter for core 210 may be reset, due to commit 213; however, the counter for core 220 does not reset until the FMV counter reaches a maximum or predetermined value.

As illustrated above, live-lock events may be avoided. In one embodiment, live-lock events are avoided through resetting all counters upon commitment of a transaction causing a reset of a single counter at a maximum value. In another embodiment, it is determined first if a live-lock event is occurring through utilization of an FMV counter, which counts a number of failures while at a maximum value. Therefore, forward progress is allowed for multiple processing elements concurrently executing multiple transactions with potential data conflicts.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); read-only memory (ROM); magnetic or optical storage medium; and flash memory devices. As another example, a machine-accessible/readable medium includes any mechanism that receives, copies, stores, transmits, or otherwise manipulates electrical, optical, acoustical or other form of propagated signals (e.g., carrier waves, infrared signals, digital signals); etc including the embodiments of methods, software, firmware or code set forth above.

Reference throughout this specification to "one embodiment" or "an embodiment" means that a particular feature, structure, or characteristic described in connection with the embodiment is included in one embodiment of the present invention and is not required to be present in all discussed embodiments. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarly language does not necessarily

What is claimed is:

1. An apparatus comprising:
   a first hardware processing element configured to execute a first transaction;
   a second hardware processing element configured to concurrently execute a second transaction;
   a first counter associated with the first processing element, the first counter configured to be updated in response to successful commitment of the first transaction;
   a second counter associated with the second processing element, the second counter configured to be updated in response to successful commitment of the second transaction; and
   reset logic to initiate a first reset signal to reset the second counter in response to a successful commitment of the first transaction when the first counter holds a predetermined value;
   priority logic configured to determine the first transaction is to receive priority to continue execution and the second transaction is to be aborted in response to a data conflict between the first and the second transaction based on a first counter value from the first counter and a second counter value from the second counter.

2. The apparatus of claim 1, wherein the reset logic is also to initiate a second reset signal to reset the first counter in response to a successful commitment of the second transaction when the second counter holds the predetermined value.

3. The apparatus of claim 2, wherein updating the first and the second counter includes incrementing the first and the second counter, and wherein the predetermined value is a maximum value of the first and the second counters.

4. The apparatus of claim 2, wherein the priority logic configured to determine the first transaction is to receive priority to continue execution and the second transaction is to be aborted in response to a data conflict between the first and the second transaction based on a first counter value from the first counter and a second counter value from the second counter comprises the priority logic being configured to
   determine the first transaction is to receive priority to continue execution and the second transaction is to be aborted in response to the data conflict between the first and the second transaction if the first counter value is lower than the second counter value;
   determine the second transaction is to receive priority to continue execution and the first transaction is to be aborted in response to a data conflict between the first and the second transaction if the second counter value is lower than the first counter value; and
   determine the first transaction is to receive priority to continue execution and the second transaction is to be aborted in response to a data conflict between the first and the second transaction if the first counter value is the same as the second counter value and the first processing element is associated with a lower identification (ID) value.

5. The apparatus of claim 4, further comprising snoop logic to issue a snoop request for a data location referenced in the second transaction, wherein the snoop logic is to include a reference to a value held by the second counter in the snoop request.

6. The apparatus of claim 5, wherein the priority logic is also to compare the reference to the value held by the second counter in the snoop request with a value held by the first counter.

7. An apparatus comprising:
   a first hardware processing element to execute a first transaction;
   a first counter associated with the first processing element to be updated in response to successful commitment of the first transaction, the first counter to represent a number of transactions committed for the first processing element;
   a second counter associated with the first processing element to be updated in response to an abort of the first transaction, the second counter to represent a number of transactions aborted by the first processing element; and
   reset logic to initiate a reset of at least the first counter in response to the second counter holding a first predetermined value.

8. The apparatus of claim 7, wherein the second counter is to be updated in response to an abort of the first transaction when the first counter holds a second predetermined value.

9. The apparatus of claim 8, wherein the first counter to be updated in response to successful commitment of the first transaction includes incrementing the first counter in response to successful commitment of the first transaction, and wherein the second counter to be updated in response to an abort of the first transaction when the first counter holds a second predetermined value includes incrementing the second counter in response to an abort of the first transaction when the first counter holds a maximum value.

10. The apparatus of claim 9, wherein the first counter is a successful transaction counter, and wherein the second counter is a failure at maximum value counter.

11. The apparatus of claim 7, wherein the reset logic is also to initiate a reset of the second counter in response to successful commitment of the first transaction.

12. The apparatus of claim 7, wherein the reset logic is also to initiate a reset of another counter associated with a processing element other than the first processing element in response to the second counter holding the first predetermined value.

13. A method comprising:
    tracking a first number of transactions successfully committed by a first processing element with first tracking logic;
    tracking a second number of transactions successfully committed by a second processing element with second tracking logic;
    resetting the first tracking logic and the second tracking logic in response to the first processing element successfully committing a transaction when the first number is at a maximum value of the first tracking logic; and
    providing priority to a first transaction executing on the first processing element when a data conflict occurs between the first transaction executing on the first processing element and a second transaction executing on the second processing element based on the first number of transactions successfully committed in comparison to the second number of transactions successfully committed.

14. The method of claim 13, wherein the first tracking logic includes a first counter to be incremented in response to the first processing element successfully committing a transaction, and the second tracking logic includes a second counter to be incremented in response to the second processing element successfully committing a transaction, and wherein the maximum value of the first tracking logic includes a maximum value of the first counter.

15. The method of claim 13, wherein providing priority to a first transaction executing on the first processing element when a data conflict occurs between the first transaction executing on the first processing element and a second transaction executing on the second processing element based on the first number of transactions successfully committed in comparison to the second number of transactions successfully committed comprises:
  providing priority to a first transaction executing on the first processing element when a data conflict occurs between the first transaction and a second transaction executing on the second processing element in response to the first number being less than the second number, and providing priority to the first transaction in response to the first number being equal to the second number and a first ID value associated with the first processing element being lower than a second ID value associated with the second processing element.

16. A method comprising:
  incrementing a first commit counter associated with a first processing element in response to successfully committing a first transaction associated with the first processing element, the first commit counter to track a first number of transactions committed for the first processing element from a previous reset;
  incrementing an abort counter associated with a first processing element in response to aborting a second transaction associated with the first processing element and the first commit counter being at a maximum value;
  resetting the first commit counter to a default value in response to the abort counter being incremented to an abort threshold value; and
  providing priority to the first transaction upon a data conflict with another transaction executing on another processing element in response to the first commit counter being closer to the default value than a second commit counter associated with the another processing element upon the data conflict.

17. The method of claim 16, wherein the first processing element is one of a plurality of processing elements present on a single physical integrated circuit.

18. The method of claim 16, wherein the first processing element is selected from a group consisting of a processor, a core, and a thread.

\* \* \* \* \*